US007399393B2

(12) United States Patent
Chaput et al.

(10) Patent No.: US 7,399,393 B2
(45) Date of Patent: *Jul. 15, 2008

(54) OXIDE ION CONDUCTIVE CERAMIC MEMBRANE STRUCTURES FOR HIGH-PRESSURE OXYGEN PRODUCTION

(75) Inventors: Christophe Chaput, Limoges (FR); Thierry Terracol, Limoges (FR); Gisèle Bach, Limoges (FR); Guylaine Gouriou, Guyancourt (FR); Pascal Del Gallo, Dourdan (FR)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 489 days.

This patent is subject to a terminal disclaimer.

(21) Appl. No.: 10/470,169

(22) PCT Filed: Dec. 18, 2001

(86) PCT No.: PCT/FR01/04036

§ 371 (c)(1),
(2), (4) Date: Nov. 19, 2003

(87) PCT Pub. No.: WO02/058830

PCT Pub. Date: Aug. 1, 2002

(65) Prior Publication Data

US 2004/0069655 A1 Apr. 15, 2004

(30) Foreign Application Priority Data

Jan. 26, 2001 (FR) .................................. 01 01087

(51) Int. Cl.
C25B 13/04 (2006.01)
(52) U.S. Cl. .......................... 204/295; 429/30; 429/33; 429/40; 429/41; 429/44
(58) Field of Classification Search ................. 204/295; 429/30, 33, 40, 41, 44
See application file for complete search history.

(56) References Cited

U.S. PATENT DOCUMENTS 5,935,533 A 8/1999 Kleefisch et al.

(Continued)

FOREIGN PATENT DOCUMENTS

EP 0424691 5/1991

(Continued)

OTHER PUBLICATIONS

International Search Report for PCT/FR01/04036, Apr. 12, 2002.

(Continued)

*Primary Examiner*—Bruce F. Bell
(74) *Attorney, Agent, or Firm*—Christopher J. Cronin

(57) ABSTRACT

The invention concerns an oxide ion conductive ceramic membrane, characterized in that it comprises a non-null finite volume with non-null total thickness E, comprising, a dense layer (CD) of a solid electrolyte, a so-called bonding layer (CA), of mixed conductive porous cathode (EP) and porous anode (EP'), a cathode current collector (CC) and an anode current collector (CC'), a coating porous layer (ER), and a coating porous layer (ER'), and characterized in that the volume E of said membrane, is equal to the sum of the thickness of said elements. The membrane is used for separating oxygen from air or from a gas mixture containing same and in particular for producing ultra-pure oxygen under high pressure in a closed chamber.

79 Claims, 4 Drawing Sheets

U.S. PATENT DOCUMENTS 6,428,920 B1 * 8/2002 Badding et al. ............... 429/30
6,475,657 B1 * 11/2002 Del Gallo et al. ............. 429/30
6,492,051 B1 * 12/2002 Gopalan et al. ............... 429/31

FOREIGN PATENT DOCUMENTS

| WO | WO9628856 | 9/1996 |
|---|---|---|
| WO | WO9848923 | 11/1998 |

OTHER PUBLICATIONS

Boivin, J.C., et al., "Recent Material Developments in Fast Oxide Ion Conductors," Chem. Mat., 1998, pp. 2870-2888.

* cited by examiner

OXIDE ION CONDUCTIVE CERAMIC MEMBRANE STRUCTURES FOR HIGH-PRESSURE OXYGEN PRODUCTION

The invention relates to the field of solid-state electrochemistry.

BACKGROUND OF THE INVENTION

Elementary electrochemical cells used to separate oxygen from air, or from a gas mixture containing it, are generally formed from a ternary system consisting of solid electrolyte/electrodes/current collectors.

The solid electrolytes used for separating oxygen from a gas mixture are doped ceramic oxides, which, at the operating temperature, are in the form of a crystal lattice having oxide ion vacancies. The associated crystal structures may, for example, be fluorite, perovskite or brown-millerite cubic phases called aurivillius phases; J. C. Boivin and G. Mairesse have referenced all the $O^{2-}$ anionic conducting crystal phases in a general article (Chem. Mat., 1998, p. 2870-2888, "Recent Material Developments in Fast Oxide Ion Conductors").

The electrode materials associated with the solid electrolyte are generally perovskites. These are materials possessing a crystal structure of the $ABO_3$ or $AA'BB'O_6$ type (A, A': lanthanide and/or actinide; B, B': transition metals) based on the structure of natural perovskite $CaTiO_3$. These materials exhibit good hybrid (ionic/electronic) conductivity properties thanks to this cubic crystal structure, in which the metal ions lie at the corners and at the centre of an elementary cube and the oxygen ions at the middle of the edges of this cube. The electrode materials may also be perovskite material/purely ionic conducting material mixtures or else mixtures based on materials possessing other crystal phases, for example of the aurivillius, brown-millerite or pyrochlore type.

Current is collected either by a metal or a metal lacquer or by a metal/"inert oxide" (such as alumina) ceramic mixture, or by a metal/carbide (such as silicon carbide) mixture or by a metal/nitride (such as silicon nitride) mixture, in which the principle role of the oxide, carbide or nitride is that of mechanically blocking the segregation/sintering phenomena that appear owing to the high operating temperatures (700° C.<T<900° C.), especially when silver is used as current collector metal, or by a metal/"hybrid conductor" oxide ceramic (such as an oxide of the perovskite structure of the family of strontium-doped lanthanum manganites) mixture or by a metal/"ionic conductor" oxide ceramic (such as yttrium-stabilized zirconia) mixture.

However, the Applicant has found that when a tubular electrochemical cell closed at one end, in which the solid electrolyte is zirconium oxide stabilized with 8% (molar) yttrium oxide (8 mol % YSZ), the electrodes are made of $La_{0.9}Sr_{0.1}MnO_{3-\delta}$ (LSM), the cathode current collector is a silver lacquer and the anode current collector is a gold lacquer, is operated at a temperature of between 700 and 1000° C., whether at atmospheric pressure or under an internal oxygen pressure of between 1 and $50\times10^5$ Pa (1-50 bar) or under an external oxygen pressure of between 100 and $150\times10^5$ Pa (100-150 bar), a high cell potential (around 1.7-1.8 V) for a low applied current (3-3.5 A, i.e. 0.03-0.04 A/cm$^2$) is obtained. As a comparison, units having silver lacquer as anode current collector have, for maximum working pressures of 10 to 20 bar of oxygen, cell potentials of around 1 to 1.5 V for current densities of 0.15 A/cm$^2$.

For tubular cells made of yttrium-doped zirconia with silver-based anode current collectors and at oxygen pressures of greater than 50 bar and temperatures above 750° C., a phenomenon is observed in which the said metal evaporates because of the lowering of the melting point $T_m$(° C.) of this metal by the dissolution of oxygen, according to the equation:

$$T_m(Ag)=961-22.31p^{1/2}$$

The consequence of this evaporation is a rapid degradation in the electrochemical performance of the cells, characterized by a sudden increase in the potential and a drop in the coulombic efficiency. In the case of oxygen production at high pressure (>$50\times10^5$ Pa) by a YSZ tubular cell, the use of silver is therefore to be proscribed because of its physico-chemical properties. This is why the present silver-based current collector, in lacquer form or in the form of a silver/ceramic oxide cermet, is generally replaced with an anode current collector made of gold lacquer.

This substitution allows the cells to operate at high pressure (p($O^2$) between 50 and $150\times10^5$ Pa), but their electrochemical performance remains poor. It is necessary to maintain a low productivity (applied current per tube of around 3 A) in order to ensure that the cell is stable over time. This is because very rapid degradation in the potential of the cell is observed when it is attempted to remain at a satisfactory, namely higher, productivity level (5 to 7 A i.e. 0.05 to 0.07 A/cm$^2$).

The Applicant started from the assumption that, as a result of the observations of cells after operation, the low productivity observed (applied current density of less than 50 mA/cm$^2$ for temperatures above 800° C.) and the degradation of the cell potential, observed if the productivity were to be increased by a factor of 1.5, are the consequences of an unsuitable architecture of the cell used.

The term "architecture" is understood to mean the structures and microstructures of the various constituent materials of the ceramic membrane, namely the solid electrolyte (8 mol % YSZ, yttrium-stabilized zirconia), the electrode (LSM: strontium-doped lanthanum manganite) and the current collector (silver lacquer or silver/oxide or non-oxide ceramic cermet on the cathode side; gold lacquer on the anode side). The term "structure" is understood to mean the chosen system of stacked layers and the order of the various coatings deposited in order to make up an electrochemical cell (solid electrolyte/electrode/current collector) and the geometrical shapes (tube, plate) of the membranes.

The term "microstructure" is understood to mean the thicknesses, densities, areas and roughness within the various materials characterizing the membrane, the sizes and morphologies of the grains and/or particles of the various materials, the intergranular and intragranular porosity of the solid electrolyte the nature (morphology) of the surface of the solid electrolyte, the porosity and staking of particles of the various coatings electrode, current collector.

The Applicant assumed that the absence of porosity in the gold-based current collector could limit the diffusion and/or dissolution in this layer of "recombined" gaseous oxygen on the anode side and could result in a high overvoltage and consequently a low productivity.

In addition, the Applicant also observed that, when the cells used hitherto operated with a higher current density, so as to achieve a higher productivity (0.05-0.07 A/cm$^2$ as opposed to 0.03-0.04 A/cm$^2$), the electrode/gold-lacquer-based anode current collector coatings debonded from the external surface of the membrane (anode side: oxygen production, high pressure >100 bar) but also there was debonding of the electrode/solid electrolyte interfaces.

It also assumed that, since the increase in the productivity results in greater evolution of oxygen gas, this gas could not be rapidly removed because of the absence of porosity in the anode current collector layer was therefore one of the causes of this debonding, which could in addition be favoured by the low adhesion forces and the weak interactions between the solid electrolyte, the LSM electrode layers and the gold layer because of the low sintering temperature (<850° C.), required by the presence of silver on the cathode side, and because of the cosintering of the unit during its manufacture.

SUMMARY OF INVENTION

The Applicant therefore sought a means of increasing the productivity of a high-pressure cell and to stop the degradation described above by acting on the basis of the assumed causes.

This is why the subject of the invention is a ceramic membrane conducting by oxide ions, characterized in that it comprises a non-zero finished volume of non-zero total thickness T, comprising:

a) a dense layer (DL) of a solid electrolyte having, at the electrolysis temperature, a crystal structure conducting by oxide ions, of non-zero thickness $t_0$ and of opposed external surfaces $S_0$ and $S'_0$ that are identical or different;

b) a layer called the tie layer (TL) that possesses either a crystal structure conducting by oxide ions or a hybrid conducting crystal structure or a mixture of the two aforementioned crystal structures, the said tie layer being pressed against the surface $S_0$ of the dense layer (DL), having a non-zero thickness $t_1$, an external surface $S_1$, a specific surface area $s_{1\omega}$ and a roughness $R_1$;

c) a hybrid conducting porous cathode (PE) and a hybrid conducting porous anode (PE'), of identical or different chemical compositions, pressed one against the surface $S_1$ of (TL) and the other against the surface $S'_0$ of (DL), the said electrodes having, respectively, external surfaces $S_2$ and $S'_2$ of non-zero area, that are identical or different, and non-zero thicknesses $t_2$ and $t'_2$, that are identical or different; and d) a cathode current collector (CC) and an anode current collector (CC'), of identical or different chemical compositions, pressed respectively against the surfaces $S_2$ and $S'2$ of (PE) and (PE'), the said collectors (CC) and (CC') having external surfaces $S_3$ and $S_3'$ of non-zero area, that are identical or different, and non-zero thicknesses $t_3$ and $t'_3$, that are identical or different, respectively;

e) a porous covering layer (CL) formed from a material or a mixture of materials chemically compatible with the materials, or mixtures of materials, of the said electrodes, current collectors, tie layer and solid electrolyte, the sintering temperature of which is very close to the sintering temperatures of the constituent materials, or mixtures of materials, of the said of the said electrodes, current collectors, tie layer and solid electrolyte, the said layer (CL) being pressed against the surface $S_3$ of (CC), and optionally f) a porous covering layer (CL') made of a material or a mixture of materials that are chemically compatible with the materials or mixtures of materials of the said electrodes, current collectors and solid electrolyte, the sintering temperature of which is very close to the sintering temperatures of the constituent materials or mixtures of materials of the said of the said electrodes, current collectors, tie layer and solid electrolyte, the said layer (CL') being pressed against the surface $S_3'$ of (CC'), the said covering layer having a surface $S_4$ and a non-zero thickness $t_4$; and characterized in that the thickness T of the volume of the said membrane is equal to the sum of the thicknesses of each of the elements mentioned.

According to a first particular aspect, the subject of the invention is a membrane as defined above, in which the finished volume of thickness T includes a second tie layer (TL') possessing either a crystal structure conducting by oxide ions or a hybrid conducting crystal structure or a mixture of the two aforementioned crystal structures, the said second tie layer being pressed against the surface $S'_0$ of the dense layer (DL), and against the external surface $S'_1$ of which the electrode (PE') is pressed, the said layer (TL') having a non-zero thickness $t'_1$, a specific surface area $s'_{1\omega}$ and a roughness $R'_1$.

According to a second particular aspect, the subject of the invention is a membrane as defined above, in which the finished volume of thickness T does not include any porous covering layer (CL').

In the membrane as defined above, the finished volume of thickness T may also include an intermediate layer ($IL_{23}$) made of materials coming from the electrode (PE) and from the current collector (CC), the said layer ($IL_{23}$) having a thermal expansion coefficient ($TEC_{23}$) of between that, $TEC_2$, of (PE) and that, $TEC_3$, of (CC) and preferably greater than the $TEC_2$ and less than $TEC_3$, and being pressed against the surface $S_2$ of (PE), and against the external surface $S_{23}$ of which the collector (CC) is pressed, the said layer $IL_{23}$ having a non-zero thickness $t_{23}$, a specific surface area $s_{23\omega}$ and a roughness $R_{23}$.

It may also include a second intermediate layer ($IL'_{23}$) made of materials coming from the electrode (PE') and from the current collector (CC'), the said layer ($IL'_{23}$) having a thermal expansion coefficient ($TEC'_{23}$) of between that, $TEC'_2$, of (PE') and that, $TEC'_3$, of (CC') and preferably greater than the $TEC'_2$ and less than $TEC'_3$, and being pressed against the surface $S'_2$ of (PE'), and against the external surface $S'_{23}$ of which the collector (CC') is pressed, the said layer $IL'_{23}$ having a non-zero thickness $t'_{23}$, a specific surface area $s'_{23\omega}$ and a roughness $R'_{23}$.

It may also include an intermediate layer ($IL_{34}$) made of materials coming from the current collector (CC), and from the covering layer (CL), the said layer ($IL_{34}$) having a thermal expansion coefficient ($TEC_{34}$) of between that, $TEC_3$, of (CC) and that, $TEC_4$, of (CL) and preferably greater than the $TEC_3$ and less than $TEC_4$, and being pressed against the surface $S_3$ of (CC), and against the external surface $S_{34}$ of which the covering layer (CL) is pressed, the said layer $IL_{34}$ having a non-zero thickness $t_{34}$, a specific surface area $s_{34\omega}$ and a roughness $R_{34}$.

Finally, it may include a second intermediate layer ($IL'_{34}$) made of materials coming from the current collector (CC'), and from the covering layer (CL'), the said layer ($IL'_{34}$) having a thermal expansion coefficient ($TEC'_{34}$) of between that, $TEC'_3$, of (PE') and that, $TEC'_4$, of (CL') and preferably greater than the $TEC'_3$ and less than $TEC'_4$, and being pressed against the surface $S'_3$ of (CC'), and against the external surface $S'_{34}$ of which the covering layer (CL') is pressed, the said layer $IL'_{34}$ having a non-zero thickness $t'_{34}$, a specific surface area $s'_{34\omega}$ and a roughness $R'_{34}$.

As the examples described later in the present description will illustrate, the role of the developed specific surface area(s) and roughness(es) on the faces $S_0$ and $S'_0$ of the solid electrolyte is to allow better "bonding" of the successive superjacent coatings, electrodes, current collectors and protective layers, to increase "volumewise" the "triple" points by delocalizing the oxygen reduction/oxidation reactions, in order to improve the electrochemical performance of the cells, and to limit the degradation phenomena that may occur under the operating conditions over the course of time, these being due in particular to the extraction of the oxygen produced and to the Joule effect.

The expression "crystal structure conducting by oxide ions" is understood to mean, within the context of the present invention, any crystal structure which, at the operating temperature, is in the form of a crystal lattice possessing oxide ion vacancies. The associated crystal structures may, for example, be fluorite, perovskite or brown-millerite cubic phases called aurivillius phases or else those phases mentioned in J. C. Boivin and G. Mairesse, Chem. Mat., 1998, pp. 2870-2888, "*Recent Material Developments in Fast Oxide Ion Conductors*".

The expression "material or mixture of materials chemically compatible with that of the solid electrolyte, electrodes or current collectors" is understood to mean in the present description any material or mixture of materials that, at a sintering temperature of between about 600° C. and 1200° C., does not enter into a chemical reaction with that or those of the layer that it coats. Such a chemical reaction would possibly be manifested by the appearance of one or more chemical compounds absent from the initial materials or mixtures of materials.

The term "porous" indicates in the present description that the layers of materials in question must be capable of allowing dioxygen to diffuse. In general, their porosity index is between 10% and 70%, more precisely between 30 and 60%.

The term "specific surface area" of the "tie" layer means that the specific surface area developed by the said layer is between 0.01 and 500 m$^2$/g, more precisely between 0.1 and 50 m$^2$/g.

The term "roughness" of the "tie" layer means that the roughness of the said layer is between 0 and 500 µm and more particularly between 10 and 300 µm.

The term "hybrid conducting" means in the present description that the layers of materials in question are both ionic and electronic conductors.

The expression "very similar sintering temperatures" means that the difference between the sintering temperatures of the "tie" layer and of the solid electrolyte, of the intermediate layer and of the subjacent and superjacent layers and of the porous covering layer and of the current collector is less than or equal to about 500° C., preferably less than 300° C. This is because, when this difference becomes too great, an interlayer delamination phenomenon is observed, this being a sign of poor adhesion of the sintered layers. The development of the specific surface area/roughness of the surface of the solid electrolyte must allow better adhesion/bonding of the various successive layers and in fact prevent the phenomena of delamination and flaking of the successive porous layers.

According to a third particular aspect, the subject of the invention is a membrane as defined above, characterized in that $t_2=t'_2$.

According to a fourth particular aspect, the subject of the invention is a membrane as defined above, characterized in that $t_3=t'_3$.

According to a fifth particular aspect, the subject of the invention is a membrane as defined above, characterized in that $t_1=t'_1$.

According to a sixth particular aspect, the subject of the invention is a membrane as defined above, characterized in that $t_{23}=t'_{23}$.

According to a seventh particular aspect, the subject of the invention is a membrane as defined above, characterized in that $t_{34}=t'_{34}$.

According to an eighth particular aspect, the subject of the invention is a membrane as defined above, characterized in that $t_4=t'_4$.

In the ceramic membrane forming the subject-matter of the present invention, the thickness $t_0$ is in general between about 0.01 mm and about 2 mm and more particularly between about 0.05 mm and about 1 mm, the thicknesses $t_1$ and $t'_1$, are is in general between about 1 µm and 500 µm and more particularly between 10 µm and 300 µm, the thicknesses $t_2$ and $t'_2$ are in general between about 1 µm and about 500 µm and more particularly between about 10 µm and about 300 µm, the thicknesses $t_3$ and $t'_3$ are in general between about 1 µm and about 500 µm and more particularly between about 20 µm and about 300 µm, the thicknesses $t_4$ and $t'_4$ are in general between about 1 µm and about 500 µm and more particularly between about 10 µm and about 300 µm, the thicknesses $t_{23}$ and $t'_{23}$ are in general between about 1 µm and about 500 µm and more particularly between about 10 µm and about 300 µm and the thicknesses $t_{34}$ and $t'_{34}$ are in general between about 1 µm and 500 µm and more particularly between 10 µm and 300 µm.

The ceramic membrane forming the subject-matter of the present invention may consist of a plate of plane area S and thickness T and is characterized in that each area of the surfaces $S_0$, $S'_0$, $S_1$, $S_2$, $S'_2$, $S_3$, $S'_3$, $S_4$ and, where appropriate, $S'_1$, $S'_4$, $S_{23}$, $S'_{23}$, $S_{34}$ and $S'_{34}$, is equal to the area of S. In this case, the length L of the plate is in general between about 1 cm and about 1 m, and more particularly between 5 cm and about 50 cm, and its width w between about 1 cm and about 1 m, and more particularly between 5 cm and about 50 cm.

The membrane forming the subject-matter of the present invention may also have a tubular shape open at both ends or at only one of its ends. It then consists of a hollow cylinder open at both its ends or at only one of them, of outside diameter D and inside diameter d and is characterized in that the support layer is the dense layer (DL) of the solid electrolyte, in that the surfaces $S_0$, $S'_0$, $S_1$, $S_2$, $S'_2$, $S_3$, $S'_3$, $S_4$ and, where appropriate $S'_1$, $S'_4$, $S_{23}$, $S'_{23}$, $S_{34}$ and $S'_{34}$, are cylindrical and coaxial and in that the thickness T is of the membrane is equal to half of the difference (D−d). In this case, its length L is between about 1 cm and about 1 m and more particularly between 10 cm and 50 cm.

According to a ninth particular aspect, the subject of the invention is a membrane as defined above, of tubular shape, consisting of a hollow cylinder open at only one of its two ends, in which the cathode (PE) and the cathode current collector (CC) and the porous covering layer (CL) are placed on the internal wall of the said cylinder and the anode (PE') and the anode current collector (CC') are placed on the external wall of the said cylinder. Such an arrangement is illustrated in FIG. 1A.

The solid electrolyte (DL) used in the ceramic membrane forming the subject-matter of the present invention is generally chosen from doped ceramic oxides that, at the operating temperature, are in the form of a crystal lattice with oxide ion vacancies. More particularly, they possess a fluorite structure and are preferably chosen from compounds of formula (I):

$$(M_\alpha O_\beta)_{1-x}(R_\gamma O_\delta)_x \qquad (I)$$

in which M represents at least one trivalent or tetravelent atom chosen from Bi, Ce, Zr, Ga, Th or Hf, α and β are such that the structure $M_\alpha O_\beta$ is electrically neutral, R represents at least one divalent or trivalent atom chosen from Mg, Ca, Ba, Sr, Gd, Sc, Yb, Y, Sm or La, γ and δ are such that the structure $R_\alpha O_\beta$ is electrically neutral and x is generally between 0.05 and 0.30 and more particularly between 0.075 and 0.15.

A solid electrolyte may consist, for example, of a single oxide $MO_2$ combined with one or more oxides $R_{\gamma O\delta}$ or else a mixture of oxides $MO_2$ combined with one or more oxides $R_\gamma O_\delta$.

As ceramic oxides of formula $M_\alpha O_\beta$, there are mainly zirconium oxide ($ZrO_2$), cerium oxide ($CeO_2$), hafnium oxide ($HfO_2$), thorium oxide ($ThO_2$), gallium oxide ($Ga_2O_3$) or bismuth oxide ($Bi_2O_3$). These oxides are doped with one or more oxides chosen generally from magnesium oxide (MgO), calcium oxide (CaO), barium oxide (BaO), strontium oxide (SrO), gadolinium oxide ($Gd_2O_3$), erbium oxide ($Er_2O_3$), indium oxide ($In_2O_3$), niobium oxide ($Nb_2O_3$), scandium oxide ($Sc_2O_3$), ytterbium oxide ($Yb_2O_3$), yttrium oxide ($Y_2O_3$), samarium oxide ($Sm_2O_3$) and lanthanum oxide ($La_2O_3$).

As main examples of solid electrolytes, there are stabilized zirconias (zirconium oxides), gallates (materials based on gallium oxide), BiMeVOx-type materials or cerium oxides.

According to a tenth particular aspect, the subject of the invention is a membrane as defined above, characterized in that the solid electrolyte is yttrium-oxide-stabilized zirconium oxide of formula (Ia):

$$(ZrO_2)_{1-x}(Y_2O_3)_x \qquad (Ia)$$

in which x is between 0.05 and 0.15 (called hereinafter YSZ (x in mol %)). These compounds work at temperatures of between 700 and 1000° C.

The electrodes (PE) and (PE') associated with the solid electrolyte, having identical or different chemical compositions, are especially made of a material or of a mixture of materials having a perovskite ($ABO_3$) or similar structure (pyrochlore ($A_2B_2O_7$), brown-millerite ($A_2B_2O_5$)) or BiMeVOx (aurivillius phases).

Perovskite materials—the main electrode materials, are represented by the formula (II):

$$M_1M_2O_3 \qquad (II)$$

in which $M_1$ represents one or more atoms chosen from families of alkaline-earth metals, lanthanides and actinides and more particularly chosen from La, Ce, Pr, Nd, Pm, Sm, Eu, Gd, Tb, Dy, Ho, Er, Tm, Yb, Lu, Y or Mg, Ca, Sr and Ba, and $M_2$ represents one or more atoms chosen from the transition metals, more particularly chosen from Sc, Ti, V, Cr, Mn, Fe, Co, Ni, Cu and Zn.

According to a eleventh particular aspect, the subject of the invention is a membrane as defined above, characterized in that the electrodes, of identical or different compositions, are more particularly chosen from lanthanum nickel oxide ($LaNiO_3$), calcium lanthanum manganites ($Ca_uLa_vMnO_w$), lanthanum strontium manganites ($La_uSr_vMnO_w$), lanthanum strontium cobaltites ($La_uSr_vCoO_w$), calcium lanthanum cobaltites ($Ca_uLa_vCoO_w$), gadolinium strontium cobaltites ($Gd_uSr_vCoO_w$), lanthanum strontium chromites ($La_uSr_vCrO_w$) lanthanum strontium ferrites ($La_uSr_vFeO_w$) and lanthanum strontium ferrocobaltites ($La_uSr_vCo_dFe_cO_w$), in which u+v and c+d are equal to 1 and w is such that the structure in question is electrically neutral.

The layers (TL) and, where appropriate (TL'), developed on either side of the ceramic membrane have a composition identical to or different from that of the dense layer (DL) of the solid electrolyte defined above.

The subject of the invention is preferably a ceramic membrane, as defined above, in which the layers (TL) and (TL') have a chemical composition identical to that of the dense solid electrolyte layer DL.

In this case and according to an twelfth particular aspect, the subject of the invention is a ceramic membrane as defined above, characterized in that it comprises a non-zero finished volume of non-zero total thickness T, comprising:

a) a layer of a solid electrolyte with a continuous controlled surface porosity gradient (CE) having, at the electrolysis temperature, a crystal structure conducting by oxide ions, with a non-zero thickness $t_0+t_1+t'_1$ and of opposed external surfaces $S_1$ and $S'_1$ of identical area, identical specific surface areas $s_{1-\omega}$ and $s'_{1\omega}$ and identical roughness $R_1$ and $R'_1$;

b) a hybrid conducting porous cathode (PE) and a hybrid conducting porous anode (PE'), of identical or different chemical compositions, pressed one against the surface $S_1$ of (TL) and the other against the surface $S'_0$ of (DL), the said electrodes having external surfaces $S_2$ and $S'_2$ of identical or different non-zero areas and identical or different non-zero thicknesses $t_2$ and $t'_2$, respectively; and c) a cathode current collector (CC) and an anode current collector (CC'), of identical or different chemical compositions, pressed respectively against the surfaces $S_2$ and $S'_2$ of (PE) and (PE'), the said collectors (CC) and (CC') having external surfaces $S_3$ and $S_3'$ of identical or different non-zero areas and identical or different non-zero thicknesses $t_3$ and $t'_3$, respectively;

d) a porous covering layer (CL) made of a material, or a mixture of materials, chemically compatible with the materials or the mixtures of materials of the said electrodes, current collectors, tie layer and solid electrolyte, the sintering temperature of which is very close to the sintering temperatures of the constituent materials, or mixtures of materials, of the said of the said electrodes, current collectors, tie layer and solid electrolyte, the said layer (CL) being pressed against the surface $S_3$ of (CC), and optionally e) a porous covering layer (CL') made of a material or a mixture of materials that are chemically compatible with the materials or mixtures of materials of the said electrodes, current collectors and solid electrolyte, the sintering temperature of which is very close to the sintering temperatures of the constituent materials or mixtures of materials of the said of the said electrodes, current collectors, tie layer and solid electrolyte, the said layer (CL') being pressed against the surface $S_3'$ of (CC'), the said covering layer having a surface $S'_4$ and a non-zero thickness $t'_4$; and characterized in that the thickness T of the volume of the said membrane is equal to the sum of the thicknesses of each of the layers mentioned.

The composition of the tie layers (TL), and where appropriate (TL'), may also be a mixture of the various constituent materials of the ceramic membrane, namely the solid electrolyte, the electrodes, the current collectors and the protective layer or layers. In this case, the composition of the tie layers (TL), and where appropriate (TL'), are preferably either a mixture of the constituent materials of the solid electrolyte and the electrodes (PE) and (PE') or a mixture a mixture of the constituent materials of the electrodes (PE) and (PE') and most particularly made of a mixture of compounds of formula (Ia) and formula (II). The tie layers (TL) and where appropriate (TL') have in the latter case identical or different chemical compositions.

The current collectors (CC) and (CC'), pressed against the said two porous electrodes (PE) and (PE'), of identical or different chemical compositions, and consist essentially either of a metal or of a metal lacquer and more particularly a platinum lacquer, a palladium lacquer, a gold lacquer or a silver lacquer, or a metal/"inert oxide" ceramic mixture, more particularly a metal/alumina mixture, or of a metal/"hybrid conductor" oxide ceramic mixture and more particularly a metal/perovskite material mixture, or of a metal/"ionic conductor" oxide ceramic mixture and more particularly a metal/ yttrium (8 mol %)-stabilized zirconia mixture or of a metal/ "electronic conductor" oxide ceramic mixture and more particularly a metal/nickel oxide mixture, or of a metal/carbide mixture, and more particularly a metal/silicon carbide mixture, or of a metal/nitride mixture and more particularly a metal/silicon nitride mixture, or of a mixture of one or more of the mixtures defined above. The current collectors (CC) and (CC'), of identical or different compositions, are, more particularly, made of a mixture of a metal chosen either from the transition metals, such as for example silver, copper or nickel or from noble metals such as gold, platinum or palladium with either one or more compounds of formula (I) as defined above or with one or more compounds of formula (II) as defined above.

The current collector may also be defined as being obtained from one or more of the mixtures defined above, to which mixture(s) pore-forming agents may or may not have been added during the synthesis phase.

The term "pore-forming agent" denotes any material capable of being eliminated by thermal decomposition during the binder-removal step prior to sintering, leaving pores in the material obtained after this step and without leaving any residues. As pore formers, polymers existing in particulate form and relatively isotropic form are preferred, such as, for example, micronized polypropylene waxes (for example, PropylTex™270S or PropylTex™325S from MicroPowders, Inc.), polyamides (for example ORGASOL™ from Elf Atochem), latices, polytetrafluorethylene, and polystyrene spheres. Cellulose fibres (for example ARBOCEL™BE600-10 from Rettenmeier), starch (for example standard corn starch, standard SP wheat starch, or potato starch from Roquette Frères, REMYRISE™DR rice starch from Rémy) fibres or graphite fibres are also used as pore formers.

They may also be current collector wires based on oxidizable materials covered with non-oxidizable materials or alloys, such as for example a thin layer of gold, silver or platinum or a mixture of two or three of these elements.

The constraints associated with the current collector materials on the anode side are mainly, apart from the appropriate physico-chemical properties (electrical conductivity, thermal expansion coefficient, mechanical strength, chemical stability, etc.), a stability under high oxygen pressure (>50 bar).

According to a thirteenth particular aspect of the present invention, the cathode current collector (CC) is either made of a mixture of silver with one or more compounds of formula (II), preferably strontium-doped lanthanum manganite (LSM) and most particularly 'ceramic/"hybrid conductor" ceramic mixture and preferably the mixture Ag/(8%)YSZ/ LSM.

According a fourteenth particular aspect of the present invention, the anode current collector (CC') is either a coating of porous gold, or is made of a mixture of gold and yttrium-oxide-doped zirconia, referably (8%)YSZ or made of a mixture of gold with one or more compounds or formula (II), preferably strontium-doped lanthanum manganite (LSM) and most particularly $La_{0.9}Sr_{0.1}MnO_{3-\delta}$, or strontium-doped lanthanum ferrocobaltite (LSCoFe) and most particularly $La_{0.8}Sr_{0.2}CO_{0.8}Fe_{0.2}O_w$.

The covering layer (CL) and where appropriate the covering layer (CL') have identical or different compositions. They may be hybrid or electronic conductors or they may be insulating, while still being sufficiently porous to allow gaseous diffusion of oxygen on both sides of the membrane.

When they are insulating, they may be made of an enamel.

When they are hybrid conductors, they may be made, for example, of a perovskite material or a mixture of perovskite materials or a mixture of perovskite materials or of similar families (pyrochlores, brown-millerite) and of purely ionic conductors or of a mixture of metallic conducting materials and of one or more of the compounds defined above.

According to a fifteenth particular aspect, the subject of the invention is a ceramic membrane as defined above, in which the covering layer (CL), and where appropriate (CL'), is insulating.

According to a sixteenth particular aspect, the subject of the invention is a ceramic membrane as defined above, in which the covering layers (CL), and where appropriate (CL'), are made of compounds or mixtures of compounds of formula (II) and more particularly of compounds of formula $La_uSr_v CO_dFe_cO_w$ in which u+v and c+d are equal to 1 and w is such that the structure in question is electrically neutral, and preferably of a compound of formula (IIa):

$$La_{0.8}Sr_{0.2}CO_{0.8}Fe_{0.2}O_w \qquad (IIa)$$

in which w is such that the structure of formula (IIa) is electrically neutral.

According to a seventeenth particular aspect, the subject of the invention is a ceramic membrane as defined above, in which each of the current collectors (CC) and (CC') is connected to the external part of the circuit via an electronically conducting wire made of a metal identical to or different from that of which the said current collectors are composed, and preferably of an identical metal.

According to a variant of the present invention, the cylindrical ceramic membrane, of developed specific surface area/ roughness on the solid electrolyte, as defined above, is filled with mullite or zirconia or alumina beads so as to improve the fastening of the said wire to the said current collector. The nature of the beads may also be of the metallic or metal carbide type, or of beads of mullite or zirconia or alumina that is covered with a current collector layer having the same nature as or a different nature from the current collector layer of the tubular electrochemical cell. The beads may also be of the perovskite type of the same chemical composition as, for example, the protective layer.

A variant of the present invention also consists either in substituting the internal current collector wire made of Ag and the mullite, zirconia or alumina beads with a silver-based current collector tube whose function is to ensure electrical continuity over the entire length of the internal cathode surface and allow a uniform influx of air at the closed end of the tube, or in keeping the silver-based current collector wire and substituting the mullite or zirconia or alumina beads with a quartz tube so as to allow a uniform influx of air at the closed end of the tube.

The ceramic membrane of developed specific surface area/ roughness on the solid electrolyte faces $S_O$ and $S'_O$, forming the subject of the present invention, is prepared by successive sequences consisting of the deposition of a given commercially available material followed by the sintering of the resulting combination, using the solid electrolyte as material for supporting the said membrane and possessing, on both sides, a developed or non-developed surface area/roughness, which may or may not be of the same type as the solid electrolyte material. These sequences of operations are well known to those skilled in the art. In general, the solid-electrolyte ceramic membrane is produced by carrying out one or more conventional ceramic forming techniques such as, for example, cold isostatic pressing, hot isostatic pressing, extrusion, tape casting, or screen printing. The tie layers allowing the development of the specific surface area and the roughness on both sides on the surfaces $S_0$ and $S'_0$ of the solid electrolyte are deposited either on the green membrane (before sintering) or on the presintered membrane or on the ceramic membrane after sintering.

The development of the specific surface area and the roughness consists in depositing, on the surface of the ceramic membrane, a coating containing either the same material as the solid electrolyte, or one or more of the constituent materials of the electrical cell, or a mixture of constituent materials of the electrochemical cell. The coatings of this "tie" layer on the dense solid electrolyte of planar and/or tubular shape are produced by techniques well known to those skilled in the art, namely, but not exhaustively, by spraying a powder suspension onto the solid electrolyte, by depositing a powder suspension by filling/draining (dip coating), by depositing a powder suspension by screen printing or by depositing a powder suspension with a brush (painting).

After the "tie" layer has been deposited, the ceramic membrane is either sintered so as to obtain an assembly comprising (TL), (DL) and, where appropriate, (TL') and possessing, on these external SI and optionally $S'_1$ surfaces, the specific surface area ($s_{1\omega}$ and $s'_{1\omega}$) and roughness $R_1$ and $R'_1$, or receives the successive electrode, current collector and protective layer layers successively. The successive coatings (electrode, current collector, protective layer and optionally intermediate layer(s) between the various coatings in order to harmonize the TECs) are carried out by painting, spraying, dip coating or screen printing, whether on the internal face or the external face of the device. After each layer has been deposited, a sintering is carried out in air, at the sintering temperature of the said material—between 600° C. and 1500° C. depending on the materials—for a few hours, generally from 0.25 to 10 hours. Likewise, the solid electrolyte of specific surface area/roughness, ceramic membrane of tubular, planar or elliptical geometrical shape, is prepared from commercially available products and formed using methods known to those skilled in the art and described above. The term "specific surface area" is understood to mean a surface area of between 0.01 and 500 $m^2/g$ and more particularly between 0.1 and 50 $m^2/g$. The term "roughness R" is understood to mean a value of between 0 and 500 μm and more precisely between 10 and 300 μm.

A variant consists in carrying out the manufacturer of the dense solid electrolyte possessing a specific surface area/roughness on the surface in a single step. This method is described in French Patent Application No. 00/15919 filed on Dec. 7, 2000. It comprises the following steps:

a step ($P_a$) of preparing a suspension of solid pore formers (particles, fibres or flakes) or a mixture of solid pore formers of different size and/or shape and/or nature in a solvent, if necessary in the presence of a binder and/or a plasticizer, and/or of another organic compound soluble in the solvent;

a step ($P_b$) of casting the said suspension formed in step ($P_a$);

a step ($P_c$) of evaporating the said solvent in order to form a porous pore-former substrate;

a step ($Q_a$) of preparing a suspension of solid ceramic particles in a solvent in the presence of a dispersant;

a step ($Q_b$) of adding a binder and optionally a plasticizer to the suspension prepared in step ($Q_a$);

a step ($Q_d$) of deaerating the said suspension;

a step (A) of infiltrating the porous pore-former substrate of controlled thickness with the ceramic suspension, a step (B) of evaporating the solvent in order to form a pore-former/solid ceramic composite structure;

a step (B') of cutting the composite structure into structure elements ($s_i$);

a step of back-to-back stacking of elements $S_i$ in pairs in order to form an assembly (A);

a thermocompression step carried out on (A);

a binder-removal step (C); and a sintering step (D).

According to a penultimate aspect of the present invention, the subject of the latter is the use of a ceramic membrane as defined above for separating oxygen from air or from a gas mixture containing it and more particularly for producing oxygen which may or may not be at high pressure, in a closed chamber. The oxygen thus produced is ultrapure (purity>99.9%) and it is confined in a closed chamber and may be at pressures of between 50 and $150 \times 10^5$ Pa (between 50 and 150 bar). This application is particularly beneficial for producing oxygen on board aircraft with tubular cells closed at one end, as described above.

The subject of the invention is also the use of a membrane as defined above for analysing the presence of oxygen in a gaseous atmosphere.

According to a final aspect of the present invention, the subject of the latter is a process for preparing ultrapure oxygen, consisting in separating oxygen from air by ionic conduction through a ceramic membrane, as defined above, a process for eliminating the oxygen from a gaseous atmosphere in which applications requiring atmospheres having a low oxygen content or containing no oxygen are carried out, consisting in separating oxygen from the said atmosphere by ionic conduction through the said ceramic membrane and a process for producing thermal and electrical energy within a solid fuel cell by reaction of oxygen and hydrogen, characterized in that the said oxygen is obtained by being separated from the air through the said ceramic membrane.

BRIEF DESCRIPTION OF THE DRAWINGS

FIGS. 1B-1D show SEM micrographs of microstructures of various gold based anode current collectors of the cell wherein FIG. 1B is a micrograph of an anode current collector consisting of a gold lacquer; FIG. 1C is an anode current collector of a porous gold lacquer coming from a gold/pore-former mixture and FIG. 1D is an anode current collector that consists of a gold lacquer/perovskite (LSCoFe) mixture.

DETAILED DESCRIPTION OF PREFERRED EMBODIMENTS

The following examples illustrate the invention without, however, limiting it.

Preparation of the Electrochemical Cell

The electrochemical properties of a tubular cell illustrated in FIG. 1, having developed specific surface area/roughness on both its faces S and S', were analysed. The architecture of the tubular cell is described in FIG. 1A. The unit consisted of:
- a (8 mol %) YSZ dense solid electrolyte having, on either side, tie surfaces (TL) and (TL'), of specific surface area $(s_\omega, s'_\omega)$/roughness (R, R') of the same type (identical coating thicknesses: t'=t");
- a cathode (PE) based on strontium-doped lanthanum manganite (LSM), in this case LSM $(La_{0.9}Sr_{0.1}MnO_{3-})$;
- a cathode current collector (CC) based on Ag-LSM (50/50 by volume) cermet coated with a "protective" layer (CL) obtained from the family of lanthanum ferrocobaltites, in this case LSCoFE $(La_{0.8}Sr_{0.2}CO_{0.8}Fe_{0.2}O_w)$;
- an anode (PE') based on strontium-doped lanthanum manganite (LSM), in this case LSM $(La_{0.9}Sr_{0.1}MnO_{3-})$;
- an anode current collector (CC') (oxygen: high oxygen pressure>50 bar) is a cermet based on gold-LSCoFe, with no "protective" layer (CL').

After each layer, "tie" layers (TL) and (TL'), electrodes (PE) and (PE'), current collectors (CC) and (CC'), protective layer (CL) had been deposited, the tube was sintered in air at temperatures between 800 and 1200° C. for a few hours, with temperature holds of between 0.25 hours and 6 hours. The system was not symmetrical in terms of deposition.

Figure 1A:
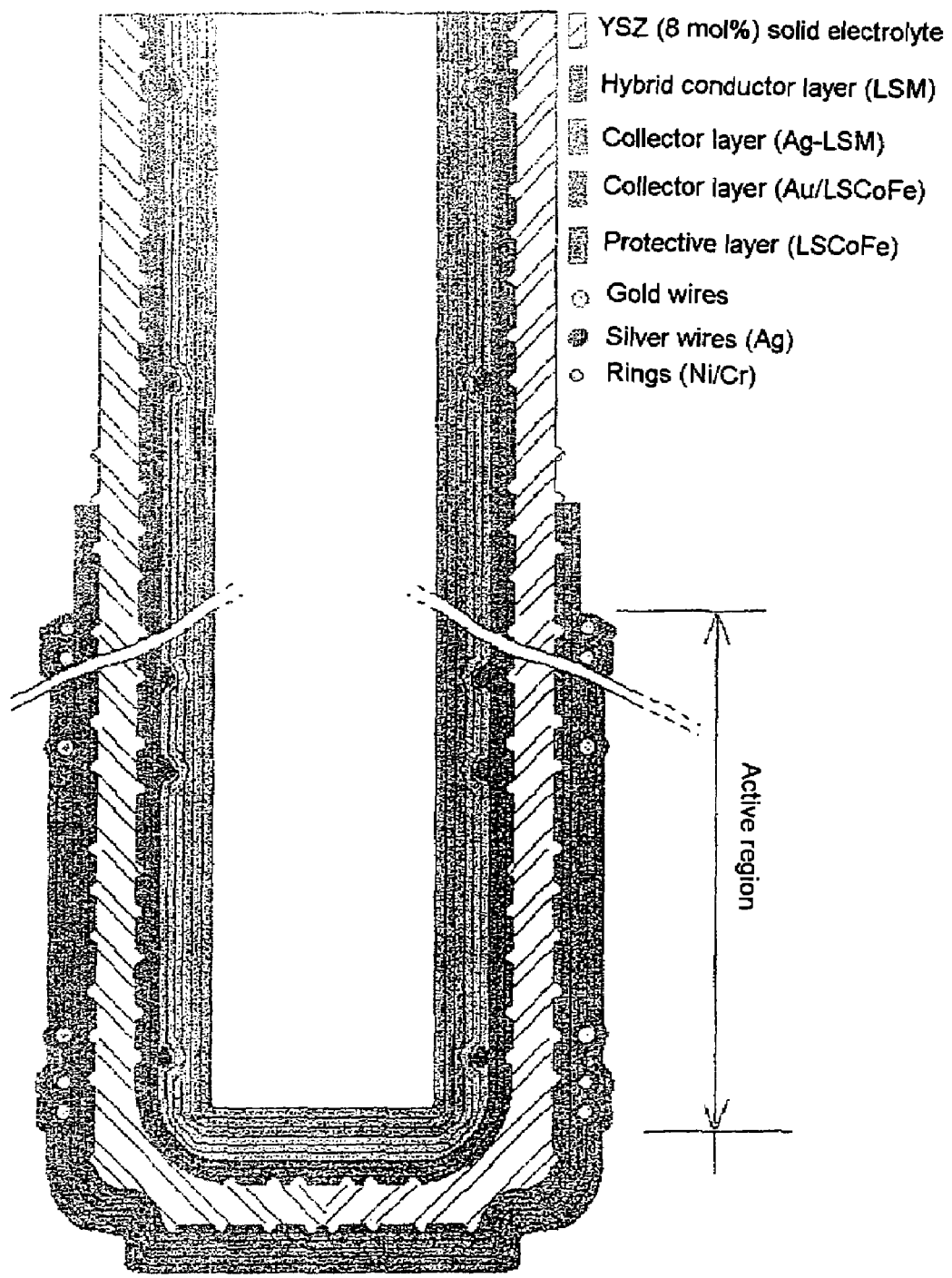
FIG. 1A shows the electrochemical properties of a tubular cell having developed specific surface area/roughness on both its faces of S and S'.
Figure 1B:
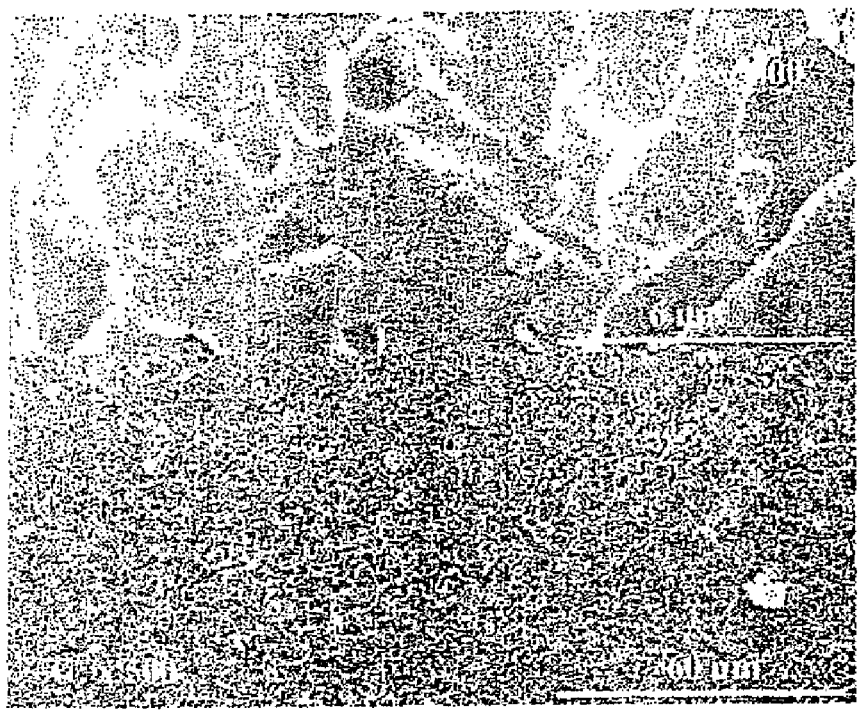
Figure 1C:
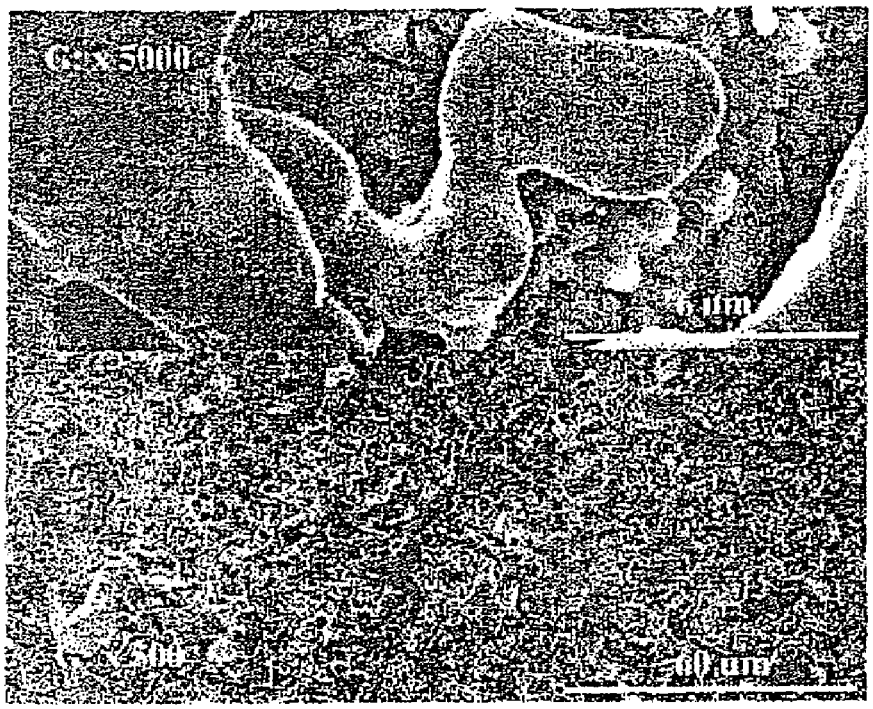
Figure 1D:
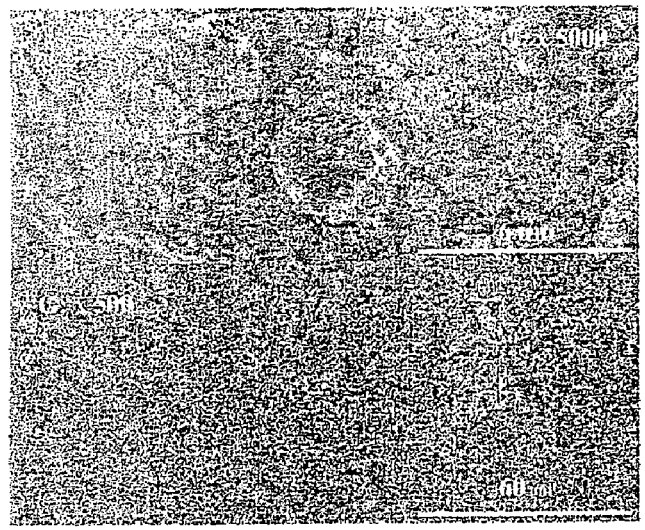

The average thicknesses to be considered were:
- layer (DL) [(8 mol % YSZ)]: 0.5 to 1.5 mm
- tie layer (TL) and (TL') [YSZ (8 mol %)] solid electrolyte: 10-100 μm
- electrodes (PE) and (PE') (LSM layers): 60-70 μm;
- cathode current collector (CC) (Ag-LSM): 100-120 μm
- anode current collector (CC') (Au-LSCoFe): 50-100 μm
- protective layer (CL) (LSCoFE): 50-90 μm FIGS. 1B to 1D show SEM micrographs of the microstructures of various gold-based anode current collectors of the cell described above in terms of the sizes and shapes of particles and surface states.

In the micrograph of FIG. 1B, the anode current collector consists of a gold lacquer.

In the micrograph of FIG. 1C, the anode current collector consists of a porous gold lacquer coming from a gold/pore-former (50/50 by volume) mixture.

In the micrograph of FIG. 1D, the anode current collector consists of a gold lacquer/perovskite (LSCoFe) (50/50 by volume) mixture.

It may be seen that in the case of a collector made of gold lacquer, the presence of a very low amount of porosity is observed. The addition of 50 vol % of pore-forming agents (corn starch: pore size of around 10 to 15 μm) induces the formation of porosity and the direct observation of the subjacent layer (LSM electrode). In operation, this opening of the pores must allow the oxygen on the anode side to be removed. The size of the gold particles (>5 μm) should be noted.

In the case of the gold/perovskite (LSCoFe) cermet, a stacking porosity is observed within the perovskite (LSCoFe), a material having a particle size of less than one micron, allowing not only good ionic/electronic hybrid conductivity (predominantly electronic) but also removal of the oxygen.

EXAMPLE 1

Influence of the Structure/Microstructure of the Anode Current Collector of YSZ (8 mol %) Ceramic Cells/Operating Parameters—Temperature: 750-780° C.; Pressure (External Oxygen Pressure): $1 \times 10^5$ Pa (1 bar); Current: 3-10 A Several tubular electrochemical cells 1 mm thick (Cell 1 to Cell 3) were prepared, these consisting of:
- a solid electrolyte made of (8%)YSZ (length: 350 mm, active surface area: 68 cm$^2$, inside diameter: 9 mm). The solid electrolytes of Cells 1 and 2 do not have a "tie" layer (TL) and (TL') unlike that of Cell 3.
- two electrodes (PE) and (PE') made of strontium-doped lanthanum manganite (LSM: $La_{0.9}Sr_{0.1}MnO_x$) thickness: (10-30 μm, porosity: 30-50%);
- a cathode current collector (CC) made of Ag-LSM (50/50 by volume) cermet (thickness: 50-70 μm, porosity between 30 and 50%); and,
- a "protective" layer (CL) on the cathode face of the LSCoFe $(La_{0.8}Sr_{0.2}CO_{0.8}Fe_{0.2}O_w)$ membrane (thickness: 30 μm, porosity: 20-70%) (deposition conditions: 800° C./0.25-1 h).
- an anode current collector (CC') consisting
  - a gold lacquer (Cell 1);
  - a porous gold lacquer obtained from a gold/pore-former (50/50 vol %) mixture (Cell 2).;
  - a gold lacquer/ perovskite (LSCoFe) (50/50 by volume) mixture (Cell 3).
- the average thicknesses of the coatings (CC') for the three cells being around 50-100 μm.

The gold-based current collectors were deposited directly on the LSM electrode and were not covered with a "protective" layer. In the high-pressure application case, air (cathode) circulates on the inside of the tube closed at one end. Oxygen is produced on the outside and is confined in a closed chamber so as to be able to rise in pressure (50-150 bar).

The coatings of the various layers (electrodes, anode and cathode current collectors, cathode protective layer) were produced by the technique of dip coating. The tie layers (TL) and (TL') were of the same kind as the dense solid electrolyte (8 mol % YSZ). The internal and external coatings were produced either by spraying or by dip coating on the presintered solid electrolyte. The membrane was then sintered before the various layers were deposited.

The tubular units operated continuously for at least 10 days (250 hours) under $1 \times 10^5$ Pa (1 bar) of oxygen at 750 or 780° C. The lifetime of the units depended on the architecture and on the structure/microstructure of the anode current collector (CC') chosen. In all situations, the coulombic efficiency (ratio of the experimental $O_2$ output to the theoretical output) was 100%.

The use of the gold lacquer resulted in high performance levels in terms of electrochemical potential (around 1.8-1.9 V, 5% degradation after 100 h) for a low productivity (<0.05 A/cm$^2$). In light of FIG. 1B, this is the consequence of a very low porosity within the anode current collector, not allowing the oxygen formed to be removed.

The addition of pore-forming agents to the current collector (particle size around 10-15 μm), for a productivity increased by a factor of 1.6-2 (0.06-0.08 A/cm$^2$), resulted in a lower cell potential (1.4 V), but higher degradation (20% rise in the potential after 100 h operation). Opening of the porosity resulted in improving the electrochemical performance but also in a system that is unstable over time. After operation, the units exhibited delamination phenomena at the anode electrode (PE')/pore-former-Au current collector (CC') interfaces, which may be explained either by excessive removal of gas and/or or by local Joule effects.

The unit having tie layers (TL) and (TL')" and an Au/LSCoFe anode current collector (CC') had a potential that was stable in operation (1.4 V; degradation<100% over 100 h) for a productivity increased by a factor of 3-3.5 (0.14-0.16 A/cm$^2$) compared with the gold lacquer. The fact of developing a "tie" layer on the solid electrolyte, of modifying the nature of the current collector (Au/LSCoFe cermet) and of modifying the sintering conditions for the coatings resulted in an improvement in the electrochemical performance (increase in productivity) and stability of the unit (absence of delamination at the electrode/current collector interface after operation).

Figure 2:
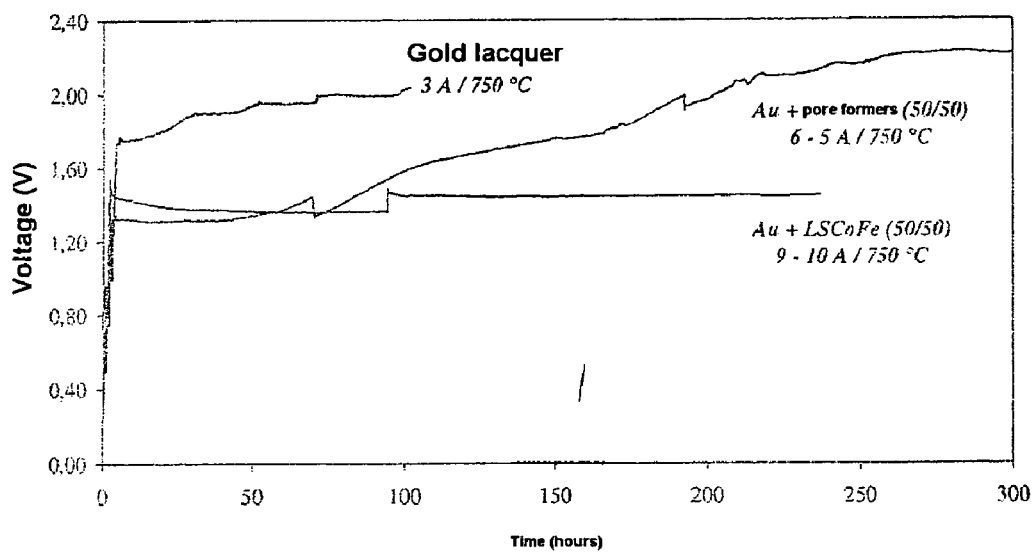
FIG. 2 shows the functions V=f(t) of each of the cells 1 to 3 and the electrochemical performance at $P(O_2)=10^5$ Pa of cell 3 having tie layers on the solid electrolyte, which develops specific surface area and roughness, compared with cells 1 and 2 that do not have the tie layers at $P(O_2)=1$ bar.

The results are given in FIG. 2 and in Table 1.

FIG. 2 shows the functions V=f(t) of each of cells 1 to 3 and demonstrates the electrochemical performance at p(O$_2$)=10$^5$ Pa (1 bar) of cell 3 having tie layers on the solid electrolyte, which thus develops specific surface area and roughness, compared with cells 1 and 2 that do not have tie layers, at p(O$_2$)=1 bar.

TABLE 1

| Cell | Operating conditions | Initial electrochemical performance | Degradation (voltage) |
|---|---|---|---|
| Cell 1 | 750° C./1 bar/ 100 h | 3 A-0.045 A/cm$^2$; 1.75 V | 5-10%/100 h |
| Cell 2 | 750° C./1 bar/ 300 h | 5-6 A-0.080 A/cm$^2$; 1.30 V | 20-25%/100 h |
| Cell 3 | 750° C./1 bar/ 300 h | 9-10 A-0.15 A/cm$^2$; 45 V | <1%/100 h |

EXAMPLE 2

Influence of the Structure-Microstructure of the Anode Current Collector of YSZ (8 mol %) Ceramic Cells—Operating Parameters: Temperature: 800-830° C.; Pressure (External Oxygen Pressure): 60-150×10$^5$ Pa (60-150 bar); Current: 3-7 A Two tubular electrochemical cells (Cell 4 and Cell 5) were prepared, these consisting of:
- a solid electrolyte made of yttrium-stabilized zirconia [YSZ(8%)] having a length of 350 mm, a thickness of 0.92 mm, an active area of 68 cm$^2$ and an inside diameter of 9 mm, (Cell 4 and Cell 5);
- two tie layers (TL) and (TL') exhibiting specific surface area/roughness on both surfaces of the YSZ solid electrolyte and of the same nature, and with a roughness R and R' of between 10 µm and 100 µm (Cell 5);
- two electrodes (PE) and (PE') made of strontium-doped lanthanum manganite (LSM: La$_{0.9}$Sr$_{0.1}$MnO$_x$) with a thickness of 15 to 30 µm and a porosity of 30 to 50% (Cell 4 and Cell 5);
- a cathode current collector (CC) made of an Ag-LSM (50/50 by volume) cermet; thickness: 120 to 130 µm; porosity: between 30 and 50%) (Cell 4 and Cell 5);
- a protective layer (CL) on the cathode face of the LSCoFe (La$_{0.8}$Sr$_{0.2}$CO$_{0.8}$Fe$_{0.2}$O$_w$) membrane, thickness: 60-80 µm, and porosity: 20-70% (Cell 4 and Cell 5) (deposition conditions: 800° C./0.5-2 h).
- an anode current collector (CC') consisting
  a gold lacquer (Cell 4);
  gold/LSCoFe (50/50 by volume) cermet (Cell 5).

The various layers (tie surface, electrodes, current collectors, protective layers) were deposited by the technique of dip coating.

The operating temperature was 800-830° C. with a temperature gradient of around +/−200° C. in the active area.

The oxygen working pressures were between 120 and 140 bar.

In both cases, the cell potentials were stable at high oxygen pressure: 140×10$^5$ Pa (140 bar) (Cell 4) and 120×10$^5$ Pa (120 bar) (Cell 5). They were around 1.6-1.7 V (Cell 4) and 1.8 V (Cell 5) for applied currents of 3.5 A (Cell 4) and 7 A (Cell 5), i.e. 0.05 and 0.1 A/cm$^2$ respectively.

Cell 5 was stable under reaction conditions (degradation<1% over 100 h) at 120 bar.

Unlike Example 1 and for an equivalent potential, the applied current was lower, respectively 1.4 V/10 A/p(O$_2$)=1 bar/750° C. in the case of Cell 3 and 1.8 V/7 A/p(O$_2$)=120 bar/800° C. in the case of Cell 5. This difference cannot be explained only by the overvoltage associated with the Nernst law. It mainly has its origin, as indicated above, in the very poor temperature gradient in the chamber under pressure (800+/−200° C. in the active area) unlike the test at 1 bar of oxygen (750+/−10° C. in the active area). The coulombic efficiencies under p(O$_2$) of between 120 and 140×10$^5$ Pa (120 and 140 bar) are equal to 100% after around 100 hours of operation.

Figure 3:
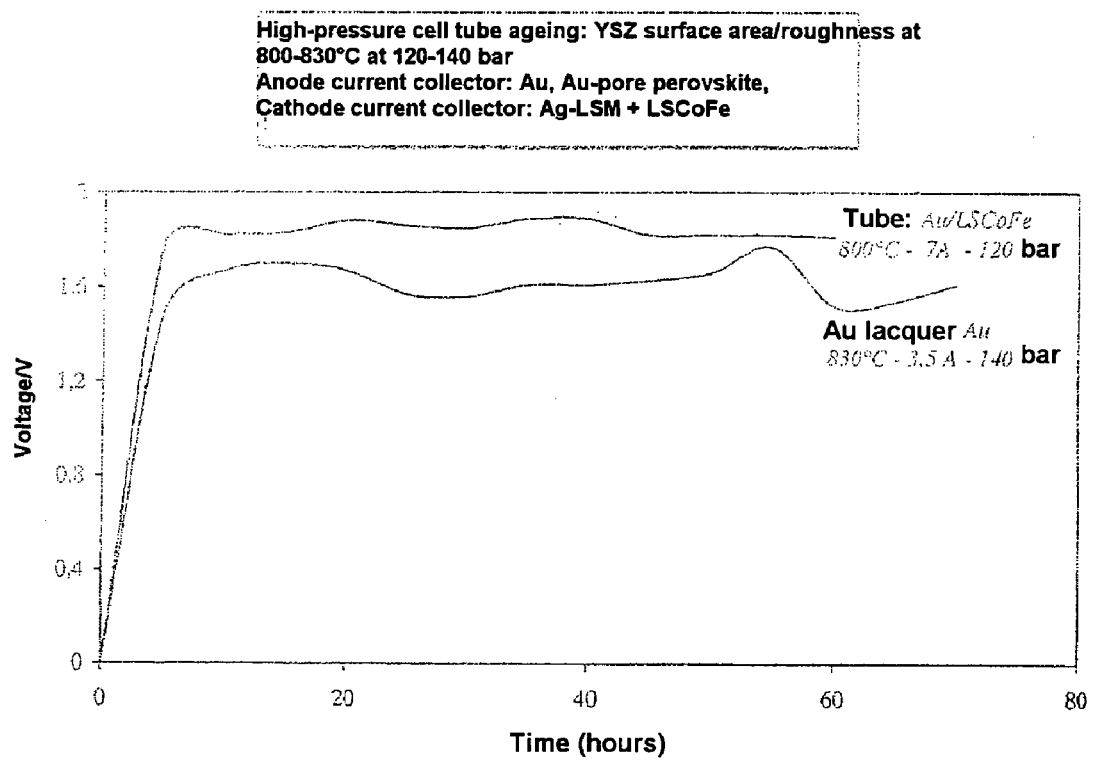
FIG. 3 shows the function V=f(t) of each of the cells 1 to 3 and demonstrates the electrochemical performance at $P(O_2)$ between 120 and $140 \times^5$ Pa of cell 5 having tie layers on the solid electrolyte, which thus develops specific surface area and roughness, compared with cell 4 which does not have tie layers.

The results are given in FIG. 3 and Table 2.

FIG. 3 shows the functions V=f(t) for each of cells 1 to 3 and demonstrates the electrochemical performance at p(O$_2$) between 120 and 140×10$^5$ Pa (1 bar) of Cell 5 having tie layers on the solid electrolyte, which thus develops specific surface area and roughness, compared with Cell 4 which does not have tie layers.

TABLE 2

| Cell | Operating conditions | Initial electrochemical performance | Degradation (voltage) |
|---|---|---|---|
| Cell 4 | 800° C./140 bar/ 70 h | 3.5 A-0.05 A/cm$^2$; 1.60 V | 1%/70 h |
| Cell 5 | 750° C./120 bar/ 70 h | 7 A-0.10 A/cm$^2$; 1.80 V | <1%/70 h |

CONCLUSION

In both the examples described above, the use of a current collector based on a metal/perovskite cermet, and more particularly Au/LSCoFe, instead of systems based on a gold lacquer or on gold/pore former as anode current collector, very substantially improves the electrochemical performance of the cells (productivity, initial potential) and very greatly slows down the ageing phenomenon, and does so for oxygen pressures of between 1 and 150×10$_5$ Pa (1 and 150 bar).

The development of specific surface area/roughness on the dense solid electrolyte allows better "bonding" of the successive coatings, principally for the electrode and the anode and cathode current collectors, and increases the number of what are called "triple" points in electrochemistry (points of contact between the solid electrolyte, the electrode and the gas (O$_2$)). There is delocalization of the electrode reaction within the volume, and no longer only at the solid electrolyte/electrode "plane" interface.

The consequences of the development of this tie layer, particularly on high-pressure units, of the same nature as the solid electrolyte and/or the electrode, combined with an electrode/anode current collector Au/perovskite or noble metal/perovskite structure, are numerous:

- stabilization of the degradation of the cells to less than 1%/100 h of operation on these units for current densities of around 0.15 A/cm$^2$ and temperatures of between 750 and 800° C. at high oxygen pressure (1-150 bar);
- operating conditions of the units, compared with "conventional" ceramic membrane systems without a tie layer and with an anode current collector of the gold lacquer type, more severe in terms of productivity (3-3.5 times) for lower initial potentials;
- constancy of the productivity (coulombic efficiency) at 1-150 bar of oxygen; and
- purity of the oxygen produced greater than 99.9% for oxygen pressures between 1 and 150 bar.

As further examples giving the advantageous results described above, there are electrochemical cells in which:

- the anode current collector (CC') is a metal/perovskite-based cermet deposited either directly on the solid electrolyte having a developed surface area/roughness, or deposited on an electrode. The materials employed in the anode current collector may be of the same nature as those employed in the cell (solid electrolyte, electrode, cathode current collector and cathode protective layer) and/or of a different nature;
- the tie layers (TL) and (TL') developed on both faces of the dense solid electrolyte are formed from the same material as the latter. However, it may be made of other constituent materials of the cell, mainly of the same nature as the electrode. In general, these may be materials of ionically conducting crystal structure (dense solid electrolyte: aurivillius, fluorite phases) and/or mixed (brown-millerite, perovskite, pyrochlore) phases;
- the protective layer (CL), in the case of units for producing oxygen at high pressure, is not necessarily developed on the anode current collector;
- the tie layers (TL) and (TL') are characterized by the fact that they may, if they are of the same nature as the dense solid electrolyte, be inseparable from the latter. The ceramic membrane is then characterized by a membrane possessing on its faces, on both sides, a specific surface area/roughness. The formation of this tie layer may be achieved either, after sintering, from a ceramic membrane, for example by isostatic pressing, or from a presintered membrane, or from a green membrane;
- the intermediate layers ($L_{ij}$) and ($L'_{ij}$) are defined as consisting of materials resulting from the subjacent and superjacent coatings (i) and (j). The thermal expansion coefficient of this layer is less than that of the superjacent layer and greater than that of the subjacent layer. The tie layer may be defined as being an intermediate layer between the solid electrolyte and the electrode. The intermediate layers ($L_{ij}$) and ($L'_{ij}$) must be sufficiently porous and of controlled thicknesses and must not influence the electrochemical performance of the cell. They consist either of ionically conducting materials, or of hybrid conducting materials, or of electronically conducting materials or of a mixture of the aforementioned materials;
- the protective layer consists (CL) of a perovskite of the LSCoFe or other type, possessing hybrid conductivity properties at low temperature (<800° C.). It may also consist of other ionically or hybrid conducting, crystal structures (aurivillius, brown-millerite, pyrochlore, fluorite, etc. phases);
- the protective layer (CL), in the case of units for producing oxygen at high pressure, is not necessarily developed on the anode current collector;
- the protective layer (CL) does not possess hybrid, ionic or electronic conduction properties. It may be an insulator. However, the layer must be sufficiently porous and of controlled thickness in order to allow oxygen to diffuse within the system and must not influence the electrochemical performance of the cell;
- beads of mullite or zirconia or alumina (diameter between 0.2 and 1 mm) may fill the tube so as to chemically fasten the internal silver wire. These beads may optionally be covered with a current collector layer, of the same nature as the current collector layer deposited on the tubular system (silver lacquer, silver-LSM (50/50 vol %) mixture, gold lacquer, etc.);
- the internal silver wire may be fastened, no longer by mullite or zirconia or alumina beads, but either by a silver tube or by a quartz tube allowing the influx of air at the closed end by the unit;
- the high-pressure cell may be either symmetrical in terms of materials, architecture and structure/microstructure, or unsymmetrical as in Examples 1 and 2.

The invention claimed is:

1. An ion conducting ceramic membrane assembly comprising a non-zero finished volume of non-zero total thickness T, that further comprises:
   a) a dense layer (DL) of a solid electrolyte comprising, at the electrolysis temperature, an oxide ion crystal conducting structure, with a non-zero thickness $t_0$ and opposed external surfaces $S_0$ and $S'_0$ that are identical or different;
   b) a tie layer (TL) having an oxide-ion conducting crystal structure of a chemical composition identical to that of layer DL, said layer TL being pressed against the surface $S_0$ of the dense layer (DL), having a non-zero thickness $t_1$, an external surface $S_1$, a specific surface area $s_{1\omega}$ and a roughness $R_1$;
   c) a tie layer (TL') having an oxide-ion conducting crystal structure of a chemical composition identical to that of layer DL, said layer TL' being pressed against the surface $S_0'$ of the dense layer (DL), having a non-zero thickness $t_1'$, an external surface $S_1'$, a specific surface area $S_{1\omega}'$ and a roughness $R_1'$;
   d) a hybrid conducting porous cathode (PE) and a hybrid conducting porous anode (PE'), comprising identical or different chemical compositions, one pressed against the surface $S_1$ of (TL) and the other against the surface $S_1'$ of TL', said electrodes having respectively, external surfaces $S_2$ and $S'_2$ of non-zero area, that are identical or different, and non-zero thicknesses $t_2$ and $t'_2$, that are identical or different;
   e) a cathode current collector (CC) and an anode current collector (CC'), comprising identical or different chemical compositions, pressed respectively against the surfaces $S_2$ and $S'_2$ of (PE) and (PE'), said current collectors (CC) and (CC') having external surfaces $S_3$ and $S_3'$ of non-zero area, that are identical or different, and non-zero thicknesses $t_3$ and $t'_3$, that are identical or different, respectively; and
   f) at least one porous covering layer (CL) formed from a material or a mixture of materials chemically compatible with the chemical compositions of said electrodes, current collectors, tie layer and solid electrolyte, with a sintering temperature very close to the sintering temperatures of the chemical compositions of said electrodes, current collectors, tie layer and solid electrolyte, the layer (CL) is pressed against the surface $S_3$ of (CC); and optionally g) a porous covering layer (CL') which further comprises at least one material that is chemically compatible with the chemical compositions of the electrodes, current collectors and solid electrolyte; wherein the sintering temperature is very close to the sintering temperatures of the chemical compositions of the electrodes, current collectors, tie layer and solid electrolyte; said layer (CL') being pressed against the surface $S_3'$ of (CC'); said layer consisting of a surface $S_4'$ and a non-zero thickness $t_4'$; and said thickness T of the volume of said membrane is equal to the sum of the thicknesses, wherein:

i) the membrane assembly has a tubular shape with a hollow cylinder open at least at one end, an outside diameter D, and an inside diameter d;

ii) a support, dense layer (DL) of the solid electrolyte, and surfaces $S_0$, $S_0'$, $S_1$, $S_2$, $S_2'$, $S_3$, $S_3'$, $S_4$ and, optionally $S_1'$ and $S_4'$ are cylindrical and coaxial; and iii) the thickness T of the membrane assembly is also equal to half of the difference (D−d); and wherein:

k) the finished volume of thickness T comprises an intermediate layer ($IL_{23}$) made of materials coming from the electrode (PE) and the current collector (CC):

wherein said layer ($IL_{23}$) has a thermal expansion coefficient ($TEC_{23}$) ranging from $TEC_2$ of (PE) to $TEC_3$ of (CC);

wherein said layer is pressed against the surface $S_2$ of (PE) and the external surface $S_{23}$ of which the collector (CC) is pressed; and wherein said layer has a non-zero thickness $t_{23}$, a specific surface area $s_{23\omega}$, and a roughness $R_{23}$.

2. The membrane assembly according to claim 1, wherein said layer ($IL_{23}$) has a thermal expansion coefficient ($TEC_{23}$) greater than $TEC_2$ and less than $TEC_3$.

3. The membrane assembly according to claim 1, wherein the finished volume of thickness T further comprises a second intermediate layer ($IL_{23}'$) made of materials coming from the electrode (PE') and the current collector (CC');

wherein said layer ($IL_{23}'$) has a thermal expansion coefficient ($TEC_{23}'$) between $TEC_2'$ of (PE') and $TEC_3'$ of (CC');

wherein said layer is pressed against the surface $S_2'$ of (PE'), and the external surface $S_{23}'$ of which collector (CC') is pressed, and wherein said layer has a non-zero thickness $t_{23}'$, a specific surface area $s_{23\omega}'$, and a roughness $R_{23}'$.

4. The membrane assembly according to claim 3, wherein said layer ($IL_{23}'$) has a thermal expansion coefficient ($TEC_{23}'$) greater than the $TEC_2'$ and less than $TEC_3'$.

5. The membrane assembly according to claim 3, wherein $t_{23}=t_{23}'$.

6. The membrane assembly according to claim 3, wherein said thicknesses $t_{23}$ and $t_{23}'$ range from about 1 μm to about 500 μm.

7. The membrane assembly according to claim 6, wherein said thicknesses $t_{23}$ and $t_{23}'$ range from about 10 μm to about 300 μm.

8. The membrane assembly according to claim 1, wherein the finished volume of thickness T further comprises an intermediate layer ($IL_{34}$) made of materials coming from the current collector (CC) and the covering layer (CL);

wherein said layer ($IL_{34}$) has a thermal expansion coefficient ($TEC_{34}$) between $TEC_3$ of (CC) and $TEC_4$ of (CL);

wherein said layer is pressed against the surface $S_3$ of (CL), and the external surface $S_{34}$ of which the covering layer (CL) is pressed, and wherein said layer has a non-zero thickness $t_{34}$, a specific surface area $s_{34\omega}$, and a roughness $R_{34}$.

9. The membrane assembly according to claim 8, wherein said layer ($IL_{34}$) has a thermal expansion coefficient ($TEC_{34}$) greater than $TEC_3$ and less than $TEC_4$.

10. The membrane assembly according to claim 8, wherein the finished volume of thickness T further comprises a second intermediate layer ($IL_{34}'$) made of materials coming from the current collector (CC') and the covering layer (CL');

wherein said layer ($IL_{34}'$) has a thermal expansion coefficient ($TEC_{34}'$) between $TEC_3'$ of (PE') and $TEC_4'$ of (CL');

wherein said layer is pressed against the surface $S_3'$ of (CC'), and the external surface $S_{34}'$ of which the covering layer (CL') is pressed, and wherein said layer has a non-zero thickness $t_{34}'$, a specific surface area $s_{34\omega}'$, and a roughness $R_{34}'$.

11. The membrane assembly according to claim 10, wherein said layer ($IL_{34}'$) has a thermal expansion coefficient ($TEC_{34}'$) greater than the $TEC_3'$ and less than $TEC_4'$.

12. The membrane assembly according to claim 10, wherein $t_{34}=t_{34}'$.

13. The membrane assembly according to claim 10, wherein said thicknesses $t_{34}$ and $t_{34}'$ range from about 1 μm to about 500 μm.

14. The membrane assembly according to claim 13, wherein said thicknesses $t_{34}$ and $t_{34}'$ range from about 10 μm to about 300 μm.

15. The membrane assembly according to claim 1, wherein $t_2=t_2'$.

16. The membrane assembly according to claim 1, wherein $t_3=t_3'$.

17. The membrane assembly according to claim 1, wherein $t_1=t_1'$.

18. The membrane assembly according to claim 1, wherein $t_4=t_4'$.

19. The membrane assembly according to claim 1, wherein said thickness $t_0$ ranges from about 0.01 mm to about 2 mm.

20. The membrane assembly according to claim 19, wherein said thickness $t_0$ ranges from about 0.05 mm to about 1 mm.

21. The membrane assembly according to claim 1, wherein said thicknesses $t_1$ and $t_1'$ range from about 1 μm to about 500 μm.

22. The membrane assembly according to claim 21, wherein said thicknesses $t_1$ and $t_1'$ range from about 10 μm to about 300 μm.

23. The membrane assembly according to claim 1, wherein said thicknesses $t_2$ and $t_2'$ range from about 1 μm to about 500 μm.

24. The membrane assembly according to claim 23, wherein said thicknesses $t_2$ and $t_2'$ range from about 10 μm to about 300 μm.

25. The membrane assembly according to claim 1, wherein said thicknesses $t_3$ and $t_3'$ range from about 1 μm to about 500 μm.

26. The membrane assembly according to claim 25, wherein said thicknesses $t_3$ and $t_3'$ range from about 10 μm to about 300 μm.

27. The membrane assembly according to claim 1, wherein said thicknesses $t_4$ and $t_4'$ range from about 1 μm to about 500 μm.

28. The membrane assembly according to claim 27, wherein said thicknesses $t_4$ and $t'_4$ range from about 10 μm to about 300 μm.

29. The membrane assembly according to claim 1, wherein said membrane consists of a plate with a plane area S and thickness T; and wherein each area of the surfaces $S_0$, $S'_0$, $S_1$, $S_2$, $S'_2$, $S_3$, $S'_3$, $S_4$ and, optionally, $S'_1$, $S'_4$, $S_{23}$, $S'_{23}$, $S_{34}$, and $S'_{34}$, is equal to the area of S.

30. The membrane assembly according to claim 29, wherein said plate consists of a length L that ranges from about 1 cm to about 100 cm.

31. The membrane assembly according to claim 30, wherein said length L ranges from about 5 cm to about 50 cm.

32. The membrane assembly according to claim 29, wherein said plate consists of a width w that ranges from about 1 cm to about 100 cm.

33. The membrane assembly according to claim 32, wherein said width w ranges from about 5 cm to about 50 cm.

34. The membrane assembly according to claim 1, wherein said membrane consists of a length L that ranges from about 1 cm to about 100 cm.

35. The membrane assembly according to claim 34, wherein said length L ranges from about 10 cm to about 50 cm.

36. The membrane assembly according to claim 1, wherein said membrane consists of a hollow cylinder open at only one end;

wherein the cathode electrode (PE) and the cathode current collector (CC) are placed on the internal wall of said cylinder; and wherein the anode (PE') and the anode current collector (CC') are placed on the external wall of said cylinder.

37. The membrane assembly according to claim 36, wherein said membrane is adapted and configured to prepare ultrapure oxygen, via separation of oxygen from air by ionic conduction through an electrochemical cell.

38. The membrane assembly according to claim 1, wherein the solid electrolyte is represented by formula (I):

$$(M_\alpha O_\beta)_{1-x}(R_\gamma O_\delta)_x$$

wherein M is at least one trivalent or tetravalent atom selected from the group consisting of: Bi, Ce, Zr, Ga, Th and Hf;

wherein α and β are such that the structure $M_\alpha O_\beta$ is electrically neutral;

wherein R is at least one divalent or trivalent atom selected from the group consisting of: Mg, Ca, Ba, Sr, Gd, Sc, Yb, Y, Sm and La; and wherein γ and δ are such that the structure $R_\gamma O_\delta$ is electrically neutral.

39. The membrane assembly according to claim 38, wherein said x ranges from about 0.05 to about 0.30.

40. The membrane assembly according to claim 39, wherein said x ranges from about 0.075 to about 0.15.

41. The membrane assembly according claim 38, wherein the solid electrolyte is at least one ceramic oxide selected from the group consisting of: $ZrO_2$, $CeO_2$, $HfO_2$, $ThO_2$, $Ga_2O_3$ and $Bi_2O_3$; and wherein the solid electrolyte is doped with at least one oxide selected from the group consisting of: MgO, CaO, BaO, SrO, $Gd_2O_3$, $Sc_2O_3$, $Yb_2O_3$, $Er_2O_3$, $Y_2O_3$, $Sm_2O_3$, $In_2O_3$, $Nb_2O_3$ and $La_2O_3$.

42. The membrane assembly according to claim 41, wherein the solid electrolyte is yttrium-oxide-stabilized zirconium oxide from formula (Ia):

$$(ZrO_2)_{1-x}(Y_2O_3)_x \qquad (Ia).$$

43. The membrane assembly according to claim 42, wherein said x ranges from about 0.05 to about 0.15.

44. The membrane assembly according to claim 1, wherein the electrodes (PE) and (PE') comprise at least one material from formula (II):

$$M_1 M_2 O_3 \qquad (II)$$

wherein $M_1$ is at least one atom selected from the group consisting of: La, Ce, Pr, Nd, Pm, Sm, Eu, Gd, Tb, Dy, Ho, Er, Tm, Yb, Lu, Y, Mg, Ca, Sr and Ba, and wherein $M_2$ is at least one atom selected from the group consisting of: Sc, Ti, V, Cr, Mn, Fe, Co, Ni, Cu and Zn.

45. The membrane assembly according to claim 44, wherein the electrodes, comprises at least one material selected from the group consisting of: $LaNiO_3$, $Ca_uLa_v MnO_w$, $La_uSr_vMnO_w$, $La_uSr_vCoO_w$, $Ca_uLa_vCoO_w$, $Gd_uSr_v CoO_w$, $La_uSr_vCrO_w$, $La_uSr_vFeO_w$ and $La_uSr_vFe_cCo_dO_w$, wherein u+v and c+d are equal to 1; and wherein w is such that the structure in question is electrically neutral.

46. The membrane assembly according to claim 1, wherein said layer (CL) is pressed against a porous covering layer (CL') which comprises at least one material chemically compatible with the materials of said electrodes, current collectors and solid electrolyte, wherein the sintering temperature is very close to the sintering temperatures of the constituent materials of the electrodes, current collectors, tie layer and solid electrolyte, wherein the layer (CL') is being pressed against the surface $S_3'$ of (CC'), wherein the layer (CL') has a surface $S'_4$ and a non-zero thickness $t'_4$; and wherein the thickness T of the volume of said membrane is equal to the sum of the thicknesses of each of the layers.

47. The membrane assembly according to claim 1, wherein the layers (TL) and (TL') contain identical chemical compositions to that of the electrodes (PE) and (PE').

48. The membrane assembly according to claim 1, wherein the layers (TL) and (TL') contain identical chemical compositions, consisting of at least one compound from formula (Ia) and formula (II);

wherein formula (Ia) is $(ZrO_2)_{1-x}(Y_2O_3)_x$;

wherein said x ranges from about 0.05 to about 0.15; and wherein formula (II) is $M_1M_2O_3$;

wherein $M_1$ is at least one atom selected from the group consisting of: La, Ce, Pr, Nd, Pm, Sm, Eu, Gd, Tb, Dy, Ho, Er, Tm, Yb, Lu, Y, Mg, Ca, Sr and Ba, and wherein $M_2$ is at least one atom selected from the group consisting of: Sc, Ti, V, Cr, Mn, Fe, Co, Ni, Cu and Zn.

49. The membrane assembly according to claim 1, wherein the current collectors (CC) and (CC') comprise at least one metal selected from the group consisting of: a metal, a metal lacquer, a metal/"inert oxide" ceramic mixture, a metal/"hybrid conductor" oxide ceramic mixture, a metal/"ionic conductor" oxide ceramic mixture, a metal/"electronic conductor" oxide ceramic mixture, a metal/carbide mixture and a metal/nitride mixture.

50. The membrane assembly according to claim 49, wherein said lacquer comprises a metal selected from the group consisting of: a platinum lacquer, palladium lacquer, gold lacquer and a silver lacquer.

51. The membrane assembly according to claim 49, wherein said metal/"inert oxide" ceramic mixture is a metal/alumina mixture.

52. The membrane assembly according to claim 49, wherein said metal/"hybrid conductor" oxide ceramic mixture is a metal/perovskite material mixture.

53. The membrane assembly according to claim 49, wherein said metal/"ionic conductor" oxide ceramic mixture comprises about 8 mol % yttrium metal with a stabilized zirconia mixture.

54. The membrane assembly according to claim 49, wherein said metal/"electronic conductor" oxide ceramic mixture comprises at least one mixture selected from the group consisting of: metal/nickel oxide mixture, metal/carbide mixture, metal/silicon carbide mixture, metal/nitride mixture and a metal/silicon nitride mixture.

55. The membrane assembly according to claim 49, wherein the current collectors (CC) and (CC'), with identical or different compositions, comprise at least one metal selected from the group consisting of: transition metals, noble metals, formula I, and formula II;
wherein formula I is $(M_\alpha O_\beta)_{1-x}(R_{65} O_\delta)_x$;
wherein M is at least one trivalent or tetravelent atom selected from the group consisting of: Bi, Ce, Zr, Ga, Th and Hf;
wherein $\alpha$ and $\beta$ are such that the structure $M_\alpha O_\beta$ is electrically neutral;
wherein R is at least one divalent or trivalent atom selected from the group consisting of: Mg, Ca, Ba, Sr, Gd, Sc, Yb, Y, Sm and La; and
wherein $\gamma$ and $\delta$ are such that the structure $R_\gamma O_\delta$ is electrically neutral; and
wherein formula II is $M_1 M_2 O_3$;
wherein $M_1$ is at least one atom selected from the group consisting of: La, Ce, Pr, Nd, Pm, Sm, Eu, Gd, Tb, Dy, Ho, Er, Tm, Yb, Lu, Y, Mg, Ca, Sr and Ba, and
wherein $M_2$ is at least one atom selected from the group consisting of: Sc, Ti, V, Cr, Mn, Fe, Co, Ni, Cu and Zn.

56. The membrane assembly according to claim 55, wherein the transition metal comprises at least one metal selected from the group consisting of: silver, copper and nickel.

57. The membrane assembly according to claim 55, wherein the noble metal comprises at least one metal selected from the group consisting of: gold, platinum and palladium.

58. The membrane assembly according to claim 55, wherein the cathode current collectors (CC), comprises at least one metal selected from the group consisting of: silver and yttrium-oxide-doped zirconia, silver with one or more compounds from formula II, silver/"ionic conductor" ceramic/"hybrid conductor" ceramic mixture;
wherein formula II is $M_1 M_2 O_3$;
wherein $M_1$ is at least one atom selected from the group consisting of: La, Ce, Pr, Nd, Pm, Sm, Eu, Gd, Tb, Dy, Ho, Er, Tm, Yb, Lu, Y, Mg, Ca, Sr and Ba, and
wherein $M_2$ is at least one atom selected from the group consisting of: Sc, Ti, V, Cr, Mn, Fe, Co, Ni, Cu and Zn.

59. The membrane assembly according to claim 58, wherein said silver and yttrium-oxide-doped zirconia comprises about 8% mol YSZ.

60. The membrane assembly according to claim 59, wherein said silver/"ionic conductor ceramic/"hybrid conductor" ceramic mixture comprises Ag, LSM and about 8% mol YSZ.

61. The membrane assembly according to claim 58, wherein said silver with one or more compounds from formula II is strontium-doped lanthanum manganite (LSM).

62. The membrane assembly according to claim 61, wherein said LSM is $La_{0.9}Sr_{0.1}MnO_{3-\delta}$.

63. The membrane assembly according to claim 58, wherein said covering layers (CL) and, optionally (CL'), comprise a compound from formula (IIa):

$$La_{0.8}Sr_{0.2}Co_{0.8}Fe_{0.2}O_w \qquad (IIa)$$

wherein said w is such that the structure of formula (IIa) is electrically neutral.

64. The membrane assembly according to claim 49, wherein the anode current collector (CC') comprises at least one metal selected from the group consisting of: porous gold, a mixture of gold and ytrium-oxide-doped zirconia, and a mixture of gold with at least one compound from formula (II); and
wherein formula (II) is $M_1 M_2 O_3$;
wherein $M_1$ is at least one atom selected from the group consisting of: La, Ce, Pr, Nd, Pm, Sm, Eu, Gd, Tb, Dy, Ho, Er, Tm, Yb, Lu, Y, Mg, Ca, Sr and Ba, and
wherein $M_2$ is at least one atom selected from the group consisting of: Sc, Ti, V, Cr, Mn, Fe, Co, Ni, Cu and Zn.

65. The membrane assembly according to claim 64, wherein said gold and ytrium-oxide-doped zirconia mixture comprises about 8% mol YSZ.

66. The membrane assembly according to claim 64, wherein said mixture of gold with at least one compound from formula (II) is LSM.

67. The membrane assembly according to claim 64, wherein said mixture of gold with at least one compound from formula (II) is strontium-doped lanthanum ferrocobaltite (LSCoFe).

68. The membrane assembly according to claim 66, wherein said LSM is $La_{0.9}Sr_{0.1}MnO_{3-\delta}$.

69. The membrane assembly according to claim 67, wherein said LSCoFe is $La_{0.8}Sr_{0.2}Co_{0.8}Fe_{0.2}O_w$.

70. The membrane assembly according to claim 1, wherein said covering layers (CL), and optionally (CL'), are insulating.

71. The membrane assembly according to claim 1, wherein said covering layers (CL), and optionally (CL'), comprise compounds or mixtures from formula (II); and
wherein formula (II) is $M_1 M_2 O_3$;
wherein $M_1$ is at least one atom selected from the group consisting of: La, Ce, Pr, Nd, Pm, Sm, Eu, Gd, Tb, Dy, Ho, Er, Tm, Yb, Lu, Y, Mg, Ca, Sr and Ba, and
wherein $M_2$ is at least one atom selected from the group consisting of: Sc, Ti, V, Cr, Mn, Fe, Co, Ni, Cu and Zn.

72. The membrane assembly according to claim 71, wherein said covering layers (CL), and optionally (CL'), comprise compounds from the formula $La_u Sr_v Co_d Fe_c O_w$;
wherein said u+v and c+d are equal to 1; and
wherein said w is such that the structure is electrically neutral.

73. The membrane assembly according to claim 1, wherein each of the current collectors (CC) and (CC') is connected to the external part of the circuit via an electronically conducting wire comprising a metal identical to or different from that of said collectors.

74. The membrane assembly according to claim 1, wherein said membrane comprises filled beads selected from the group consisting of: mullite, zirconia, alumina and perovskite.

75. The membrane assembly according to claim 1, wherein said membrane is adapted and configured to separate oxygen from air or a gas mixture.

76. The membrane assembly according to claim 1, wherein said membrane is adapted and configured to produce ultra-pure oxygen under pressure.

77. The membrane assembly according to claim 1, wherein said membrane is adapted and configured to analyze the presence of oxygen in a gaseous atmosphere.

78. The membrane assembly according to claim 1, wherein said membrane is adapted and configured to eliminate oxygen from a gaseous atmosphere, via separation of oxygen from said atmosphere by ionic conduction.

79. The membrane assembly according to claim 1, wherein said membrane is adapted and configured to produce thermal and electrical energy within a solid fuel cell by reaction of oxygen and hydrogen wherein said oxygen is separated from the air via the membrane assembly.

* * * * *

UNITED STATES PATENT AND TRADEMARK OFFICE
CERTIFICATE OF CORRECTION

PATENT NO. : 7,399,393 B2 Page 1 of 1
APPLICATION NO. : 10/470169
DATED : July 15, 2008
INVENTOR(S) : C. Chaput et al.

It is certified that error appears in the above-identified patent and that said Letters Patent is hereby corrected as shown below:

In Column 23, line 22, replace "$(M_\alpha O_\beta)_{1-\chi}(R_{65}O_\delta)_\chi$" with --$(M_\alpha O_\beta)_{1-\chi}(R_\gamma O_\delta)_\chi$--.

Signed and Sealed this

Thirteenth Day of April, 2010

David J. Kappos
*Director of the United States Patent and Trademark Office*